(12) United States Patent
Nakamura et al.

(10) Patent No.: US 11,015,072 B2
(45) Date of Patent: May 25, 2021

(54) INK, INK ACCOMMODATING UNIT, PRINTING METHOD, AND INKJET PRINTING DEVICE

(71) Applicants: Yuta Nakamura, Kanagawa (JP); Naoto Shimura, Tokyo (JP)

(72) Inventors: Yuta Nakamura, Kanagawa (JP); Naoto Shimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/583,905

(22) Filed: Sep. 26, 2019

(65) Prior Publication Data

US 2020/0102467 A1 Apr. 2, 2020

(30) Foreign Application Priority Data

Sep. 28, 2018 (JP) .............................. JP2018-184296
Jul. 4, 2019 (JP) .............................. JP2019-125141

(51) Int. Cl.
*C09D 11/102* (2014.01)
*B41J 2/175* (2006.01)
*B41M 5/00* (2006.01)
(Continued)

(52) U.S. Cl.
CPC .......... *C09D 11/102* (2013.01); *B41J 2/17503* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04;
(Continued)

(56) References Cited

U.S. PATENT DOCUMENTS

2003/0224150 A1* 12/2003 Ludwig .................... B41M 5/52
428/195.1
2011/0234688 A1* 9/2011 Ikoshi .................. B41J 2/14233
347/21
(Continued)

FOREIGN PATENT DOCUMENTS

JP 2003-213179 7/2003
JP 2004-346159 12/2004
(Continued)

*Primary Examiner* — Manish S Shah
(74) *Attorney, Agent, or Firm* — Oblon, McClelland, Maier & Neustadt, L.L.P.

(57) ABSTRACT

An ink contains water, an organic solvent, and a resin having a glass transition temperature Tg of from 0 to 70 degrees C., wherein a contact angle θ1 of the ink against a vinyl chloride resin film and a contact angle θ2 of the ink against an ink image formed with the ink satisfies the following relationship: θ1<θ2.

14 Claims, 2 Drawing Sheets

(51) Int. Cl.
*C09D 11/023* (2014.01)
*C09D 11/36* (2014.01)
*C09D 11/38* (2014.01)
*C09D 11/033* (2014.01)

(52) U.S. Cl.
CPC ......... *B41M 5/0023* (2013.01); *C09D 11/023* (2013.01); *C09D 11/033* (2013.01); *C09D 11/36* (2013.01); *C09D 11/38* (2013.01)

(58) Field of Classification Search
CPC .................. B41J 2/04588; B41J 2/04595; B41J 2/04586; B41J 2/14274; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 7/0072; B41M 5/52; B41M 5/5218; B41M 5/0023; B41M 5/0047; B41M 7/00; B41M 5/5227
See application file for complete search history.

(56) References Cited

U.S. PATENT DOCUMENTS

| | | | |
|---|---|---|---|
| 2014/0092168 A1* | 4/2014 | Ito | B41J 2/16552 347/21 |
| 2017/0044386 A1* | 2/2017 | Kagata | B41J 2/01 |
| 2017/0174919 A1 | 6/2017 | Kido et al. | |
| 2017/0335123 A1 | 11/2017 | Nakamura et al. | |
| 2017/0342288 A1* | 11/2017 | Kitade | B41J 2/01 |
| 2018/0001669 A1 | 1/2018 | Furukawa et al. | |
| 2018/0127610 A1 | 5/2018 | Kido et al. | |
| 2018/0170061 A1 | 6/2018 | Nakamura et al. | |
| 2018/0208783 A1 | 7/2018 | Takahashi et al. | |
| 2019/0270900 A1 | 9/2019 | Nakamura et al. | |

FOREIGN PATENT DOCUMENTS

| | | |
|---|---|---|
| JP | 2013-189597 | 9/2013 |
| JP | 2013-216862 | 10/2013 |
| JP | 2014-214255 | 11/2014 |
| JP | 2017-155156 | 9/2017 |

* cited by examiner

INK, INK ACCOMMODATING UNIT, PRINTING METHOD, AND INKJET PRINTING DEVICE

CROSS-REFERENCE TO RELATED APPLICATIONS

This patent application is based on and claims priority pursuant to 35 U.S.C. § 119 to Japanese Patent Application Nos. 2018-184296 and 2019-125141, filed on Sep. 28, 2018 and Jul. 4, 2019, respectively, in the Japan Patent Office, the entire disclosures of which are hereby incorporated by reference herein.

BACKGROUND

Technical Field

The present invention relates to an ink, an ink accommodating unit, a printing method, and an inkjet printing device.

Description of the Related Art

Since inkjet printers are relatively quiet, enjoy low running costs, and are capable of easily printing color images, they are now widely used at home as the output device of digital signals. Technologies of printing images on packaging materials for food, beverages, commodities, etc. utilizing an inkjet method have also been developed.

SUMMARY

According to embodiments of the present disclosure, provided is an ink which contains water, an organic solvent, and a resin having a glass transition temperature Tg of from 0 to 70 degrees C., wherein a contact angle $\theta1$ of the ink against a vinyl chloride resin film and a contact angle $\theta2$ of the ink against an ink image formed with the ink satisfies the following relationship: $\theta1<\theta2$.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An ink for inkjet recording has been proposed which contains water, a colorant, and a water-soluble organic solvent as required components, wherein the proportion of the colorant is 6 percent by mass or more in the ink, the ink has an absorption coefficient for plain paper of 3 ml/(m$^2 \cdot$(msec)$^{1/2}$), and the contact angle $\theta_0$ of the ink against plain paper is from 10 to less than 40 degrees.

In addition, non-absorptive recording medium such as plastic film is used as the printing substrate, and inks have been developed for such media.

An example of the need to directly print on such a plastic film by inkjet is the packaging printing application for food and daily necessities. For such applications, extremely high image quality is required because there are many opportunities to see the printed matter at a close distance.

An ink has been proposed in order to improve printability for vinyl chloride as a poorly absorptive substrate with little change in ink surface tension after storage for a long period of time and little deterioration of printability such as wettability over time due to a combinational use of two types of silicone-based surfactants.

An ink containing a combination of particular water-soluble organic solvents has been proposed which controls wettability and drying property to improve printability for a poorly absorptive substrate such as vinyl chloride.

However, as the printing speed increases, degradation of image quality such as uneven images ascribable to beading due to insufficient drying of ink will make a problem. To strike a balance between high performance and high image quality, a new ink for inkjet is required.

According to the present disclosure, an ink is provided to strike a balance between high performance and high quality image when printing on a non-permeable substrate such as a resin film while reducing occurrence of beading.

Ink

The ink of the present disclosure contains water, an organic solvent, and a resin, and other optional components such as a coloring material, and an additive.

The organic solvent, water, coloring material, resins, and additives for use in the ink are described below.

Organic Solvent

The organic solvent for use in the present disclosure is not particularly limited. It is preferable to contain an organic solvent having a contact angle θ3 of 20 degrees or less against a vinyl chloride resin film in an amount of 25 percent by mass, preferably 30 percent by mass or more in the entire ink to easily contain the ink of the present disclosure. By containing 30 percent by mass or more of an organic solvent having a contact angle θ3 of 20 degrees or less, leveling properties (wettability) with respect to a substrate become sufficient and fixing properties are improved.

Specific examples of the organic solvent having a contact angle θ3 of the organic solvent of 20 degrees or less against vinyl chloride resin film include, but are not limited to, tripropylene glycol monomethyl ether (θ3=8 degrees), 2-ethyl-1,6-hexanediol (θ3=10 degrees), 3-methoxy-3-methylbutanol (θ3=10 degrees), and 3-methoxy-N,N-dimethylpropionamide (θ3=20 degrees).

In addition, the proportion of an organic solvent having a boiling point of 180 degrees C. or lower is 25 percent by mass or more and more preferably 30 percent by mass or more in the entire ink to impart good drying property.

Specific examples of the organic solvent having a boiling point of 180 degrees C. or lower include, but are not limited to, 2,3-butanediol (boiling point of 180 degrees C.) and 3-methoxy-3-methylbutanol (boiling point of 173 degrees C.).

In addition, an organic solvent that is liquid at 25 degrees C. and 1 atm can be suitably used.

Examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 240 degrees C. or lower and particularly preferably 180 degrees C. or lower to obtain good drying property in addition to serving as a humectant and compatibilizer.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 25 to 60 percent by mass and more preferably from 30 to 60 percent by mass.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Coloring Material

The coloring material has no particular limit. For example, pigments and dyes are suitable.

As the pigment, inorganic pigments or organic pigments can be used. These can be used alone or in combination. In addition, it is possible to use a mixed crystal. As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (CI. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by pigment dispersion, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin

As the resin constituting the resin contained in the ink, a resin having a glass transition temperature Tg of from 0 to 70 degrees C. is used. When the glass transition temperature of the resin is set to be from 0 to 70 degrees C., film is sufficiently formed during drying by heat, thereby imparting good fixability. In addition, when the film is formed, printed matter having high hardness and excellent abrasion resistance can be obtained.

Specific examples include, but are not limited to, polyurethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Of these, the use of a polyurethane resin is preferable because abrasion resistance of printed matter is enhanced, which is preferable. Polyurethane resins are preferably polyurethane resin particles.

Resin particles made of several types of the resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and particularly preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of ink, it is preferably from 1 to 30 percent by mass and more preferably from 3 to 20 percent by mass to the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Additive

The ink may further optionally include a surfactant, a defoaming agent, a preservative and fungicide, a corrosion inhibitor, a pH regulator, etc.

Surfactant

Examples of the surfactant include, but are not limited to, silicone-based surfactants, fluorochemical surfactants, amphoteric surfactants, nonionic surfactants, and anionic surfactants.

Of these, the use of a silicone-based surfactant is preferable to increase the gloss of printed matter.

The silicone-based surfactant has no specific limit and can be suitably selected to suit to a particular application. Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

Chemical formula F-1

In the compound represented by Chemical formula F-1, m is preferably 0 or an integer of from 1 to 10 and n is preferably 0 or an integer of from 1 to 40.

Chemical formula F-2

In the compound represented by the chemical formula F-2, Y represents H or $C_mF_{2m+1}$, where m represents an integer of from 1 to 6, or $CH_2CH(OH)CH_2—C_mF_{2m+1}$, where m represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used.

Specific examples include, but are not limited to, SURFLON 5-111, S-112, S-113, 5-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

pH Regulator

The pH regulator has no particular limit as long as it can control pH to not lower than 7. Specific examples include, but are not limited to, amines such as diethanol amine and triethanol amine.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Contact Angle of Ink

In the ink of the present disclosure, the contact angle $\theta 1$ of the ink against vinyl chloride resin film and the contact angle $\theta 2$ of the ink against an ink image formed using the ink satisfy the following relationship: $\theta 1 < \theta 2$. When the relationship: $\theta 1 < \theta 2$ is satisfied, excessive coalescence of liquid droplets can be avoided, thereby obtaining printed matter having good fixability.

In the present disclosure, a vinyl chloride resin film is used as a substrate for defining the physical property value (contact angle) regarding wettability of the ink to the substrate. This is because mostly a vinyl chloride resin film is used as a printing substrate in the signage field.

As a medium for measuring the contact angle, a polyvinyl chloride film having an Rz of less than 10 μm may be used. An example of such a polyvinyl chloride film is CPPVWP1300, manufactured by SAKURAI CO., LTD. Also, other polyvinyl chloride films may be used.

The relationship between the contact angle $\theta 1$ of the ink against the vinyl chloride resin film and the contact angle $\theta 2$ of the ink against an ink image formed using the ink stems from the organic solvent contained in the ink. For example, when the proportion of an organic solvent having a contact angle $\theta 3$ of 20 degrees or less against the vinyl chloride resin film is 25 percent by mass or more, preferably 30 percent by mass or more in the entire ink, the relationship: $\theta 1 < \theta 2$ can be satisfied.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m² or less within 30 msec$^{1/2}$ of the contact of the ink according to Bristow method.

For example, plastic films such as vinyl chloride resin film, polyethylene terephthalate (PET) film, polypropylene film, polyethylene film, and polycarbonate film are suitably used as the non-permeable substrate.

The polypropylene and polyethylene mentioned above are not particularly limited. Specific examples include, but are not limited to, AR1025, AR1056, AR1082, EC1082, 1082D, 1073D, 1056D, 1025D, and FR1073 (all manufactured by DuPont-Asahi Flash Spun Products Co., Ltd.), P2002, P2102, P2108, P2161, P2171, P2111, P4266, P5767, P3162, P6181, P8121, P1162, P1111, P1128, P1181, P1153, P1157, P1146, P1147, and P1171 (all manufactured by TOYOBO CO., LTD.), YPI, Aqua-Yupo, SUPERYUPO®, ULTRA-YUPO®, New YUPO®, YUPO® Electronic Appliance's Warranty, YUPO® building material paper, YUPO® High-Gloss, YUPOJET®, and Metallized YUPO (all manufactured by Yupo Corporation).

Ink Accommodating Unit

The ink accommodating unit (ink container) of the present disclosure accommodates the ink of the present disclosure and includes a container to accommodate the ink. It may include other optional suitably-selected members.

There is no specific limit to the ink container. It is possible to select any form, any structure, any size, and any material to suit to a particular application. For example, an ink container including an ink bag made of aluminum laminate film, plastic film, etc. can be suitably used.

Recorded Matter

The ink recorded matter of the present disclosure includes a recording medium and an image formed on the recording medium with the ink of the present disclosure.

The recorded matter is obtained by an inkjet recording device executing an inkjet recording method.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present application, the recording device and the recording method respectively represent a device capable of discharging ink, various processing fluids, etc. to a recording medium and a method of conducting recording on the recording medium utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

When an infrared heater is used, at least a near infrared irradiator is provided. A device including a halogen lamp and a reflection mirror is known as the near-infrared irradiation device. Products designed to realize efficient heating by incorporating a halogen heater into the reflection mirror and making it into a heating unit have been commercialized.

Specific examples include, but are not limited to, UH-USC-CL300, UHUSC-CL700, UH-USC-CL1000, UH-USD-CL300, UHUD-CL700, UH-USD-CL1000, UH-MA1-CL300, UHMA1-CL700, and UH-MA1-CL1000 (all manufactured by USHIO INC.).

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium having A0 size and a continuous printer capable of using continuous paper rolled up in a roll-like form as a recording medium.

Figure 1:
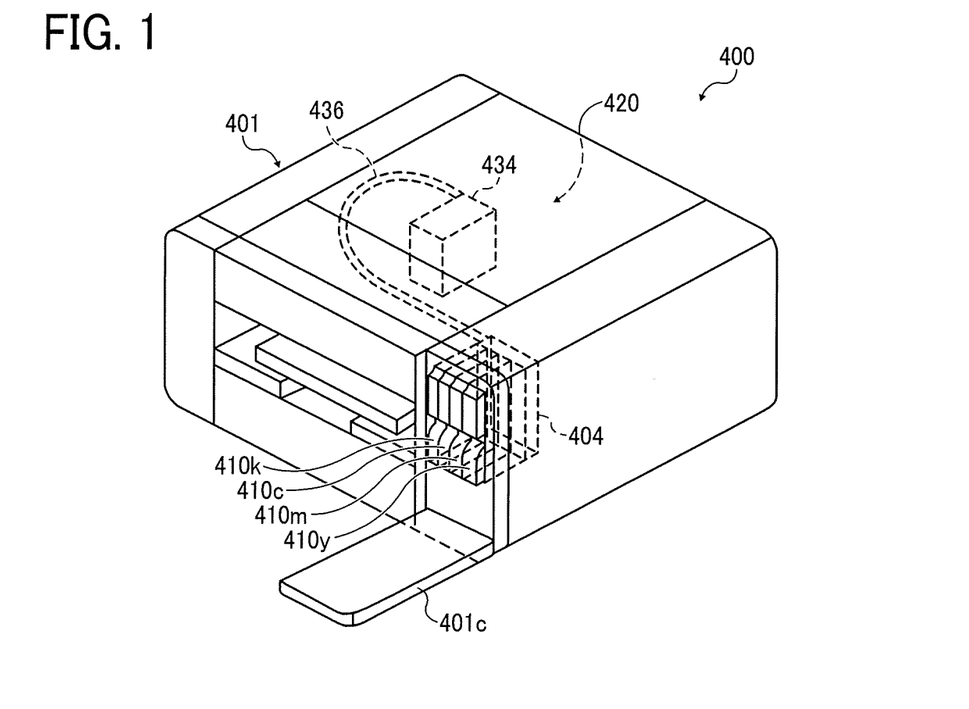
FIG. 1 is a diagram illustrating an example of the recording device using the ink according to an embodiment of the present disclosure.
Figure 2:
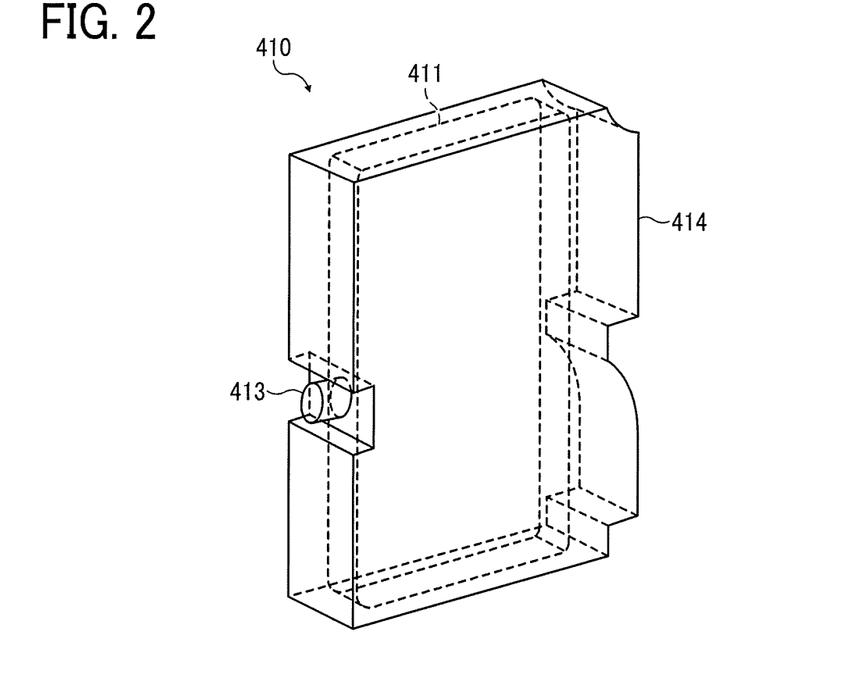
FIG. 2 is a diagram illustrating a perspective view of a main tank to accommodate the ink according to an embodiment of the present disclosure.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit (container) 411 of each main tank (ink accommodating unit) 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

A plate heater can be preferably used as the heating device. Further, this plate heater can be used in combination with other heating devices.

This recording device may include not only a portion to discharge ink but also a device referred to as a pre-processing device, a post-processing device, etc.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Heating Process and Heating Device

The heating process is to heat a recording medium during printing and can be conducted by a heating device (heater).

Quality images can be recorded on non-permeable recording media (non-permeable substrate) as the recording media with the ink of the present disclosure. However, it is preferable to heat the non-permeable recording medium during recording in order to achieve better abrasion resistance with better image quality, form images with better attachability to the recording media, and deal with high performance recording conditions. This heating process accelerates film forming of the resin contained in the ink, so that image hardness of recorded matter can be enhanced.

The heating temperatures is preferably from 40 to 100 degrees C. and particularly preferably from 40 to 60 degrees C. in terms of drying property and film forming temperature.

Figure 3:
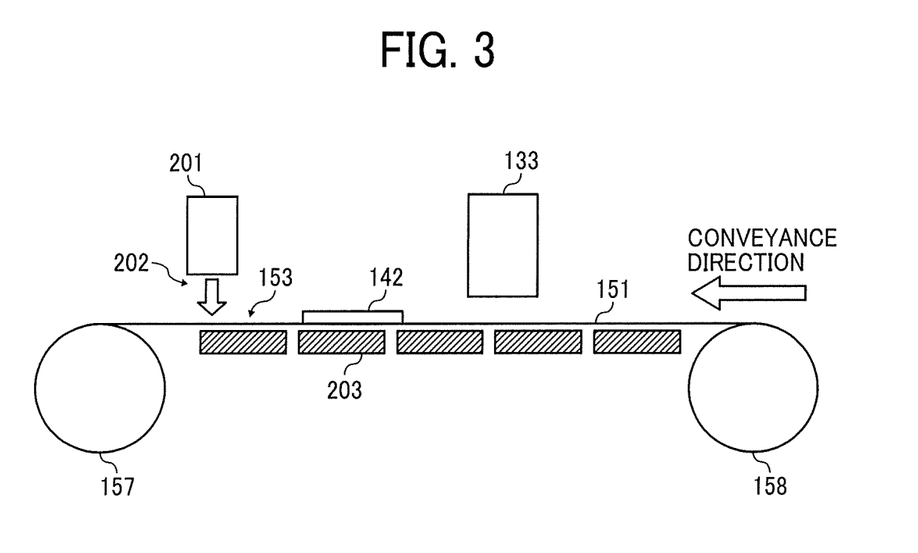
FIG. 3 is a schematic diagram illustrating an example of the heating device in the recording device illustrated in FIG. 1.

FIG. 3 is a schematic diagram illustrating an example of the heating device illustrated in FIG. 1. As illustrated in FIG. 3, a recording head is driven in response to image signals while moving a carriage 133 and discharges ink droplets onto a recording medium 142 standing still to form an image thereon. A guiding member 153 is a guiding member and also serve as a heater. A heating fan 201 as a heated wind generator blows a heated wind 202 to dry the image formed on the recording medium 142, which is conveyed on a conveyor belt 151 entrained between a conveying roller 157 and a tension roller 158.

A group of heaters 203 are disposed on the opposite side of the conveyor belt 151 regarding the recording medium 142 to apply heat to the recording medium 142 during printing.

Moreover, the drying process can be also executed before or after printing.

The contact angle is measured by observing the state when one drop of ink is dropped on vinyl chloride resin film from the horizontal direction. For example, an automatic contact angle meter (manufactured by Kyowa Interface Science Co., Ltd.) can be used for measuring. In the present disclosure, the contact angle of the ink against vinyl chloride resin film is defined as θ1 and the contact angle of the ink against a solid image printed matter is defined as θ2.

Image forming, recording, printing, print, etc. in the present disclosure represent the same meaning.

Aspects of embodiments of the present disclosure are described as follows.

1. An ink contains water, an organic solvent, and a resin having a glass transition temperature Tg of from 0 to 70 degrees C.,
wherein the contact angle θ1 of the ink against a vinyl chloride resin film and the contact angle θ2 of the ink against an ink image formed with the ink satisfies the following relationship: θ1<θ2.

2. The ink according to 1 mentioned above further contains a silicone-based surfactant.

3. The ink according to 1 or 2 mentioned, wherein the proportion of the organic solvent having a contact angle θ3 of the organic solvent of 20 degrees or less against the vinyl chloride resin film is 30 percent by mass or more in the ink.

4. The ink according to any one of 1 to 3 mentioned above, wherein the proportion of the organic solvent having a boiling point of 180 degrees C. or lower is 30 percent by mass or more in the ink.

5. The ink according to any one of 1 to 4 mentioned above further contains a polyurethane resin.

6. The ink according to 5 mentioned above, wherein the polyurethane resin contains a polyurethane resin particle.

7. An ink accommodating unit includes the ink of any one of 1 to 6 mentioned above and a container to accommodate the ink.

8. A printing method includes attaching the ink of any one of 1 to 6 mentioned above to a substrate.

9. The printing method according to 8 mentioned above further includes discharging the ink to the substrate.

10. The printing method according to 8 or 9 mentioned above further includes heating the substrate at 40 to 60 degrees C. by a plate heater.

11. An inkjet printing device includes the ink accommodating unit of 7 mentioned above.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, parts means parts by mass and percent means percent by mass excluding those in the evaluation criteria.

Preparation methods of pigment dispersions and resin emulsions to prepare ink is described below first.

Preparation Example of Pigment Dispersion

Preparation of Black Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a black pigment dispersion (concentration of pigment solid portion: 15 percent by mass) of self dispersion type.

| | |
|---|---|
| Carbon black pigment (Monarch 800, manufactured by Cabot Corporation): | 15 parts |
| Anionic surfactant (Pionine A-51-B, manufactured by TAKEMOTO OIL & FAT Co., Ltd ): | 2 parts |
| Deionized water: | 83 parts |

Preparation of Polyurethane Resin Emulsion 1

100 parts of methylethyl ketone, 345 parts of polyester-polyol 1 (which was obtained from iPA/AA=6/4 in molar ratio and EG/NPG=1/9 in molar ratio, where iPA=isophthalic acid, AA=adipic acid, EG=ethylene glycol, and NPG=neopentyl glycol, number average molecular weight of 2,000, number of average functional groups=2, and 9.92 parts of 2,2-dimethylol propionic acid (DMPA) were placed in a reaction container (2 L) equipped with a stirrer, a thermometer, a nitrogen sealing tube, and a condenser and uniformly mixed at 60 degrees C.

Thereafter, 45.1 parts of triethylene glycol diisocyanate (TEGDI) and 0.08 parts of dioctyltin dilaurate (DOTDL) were loaded therein to react at 72 degrees C. for three hours to obtain a polyurethane solution. To this polyurethane solution, 80 parts of isopropyl alcohol (IPA), 220 parts of methylethyl ketone (MEK), 3.74 parts of triethanolamine (TEA), and 596 parts of water were charged to cause transfer phase. Subsequently, MEK and WA were removed by a rotary evaporator to obtain polyurethane resin emulsion 1.

After the thus-obtained polyurethane resin emulsion 1 was cooled down to room temperature, deionized water and an aqueous solution of sodium hydroxide were added to adjust the solution such that the solid portion thereof was 30 percent by mass and the pH was 8.

The glass transition temperature (Tg) of the polyurethane resin emulsion 1 was −5 degrees as measured by Thermo plus EVO2 (manufactured by Rigaku Corporation).

Preparation of Polyurethane Resin Emulsion 2

1,500 g of polycarbonate diol (reaction product of 3-methyl-1,5-pentanediol and diphenyl carbonate, number average molecular weight Mn of 1,200), 220 g of 2,2-dimethylol propionic acid (DMPA), and 1,347 g of N-methyl pyrrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'-dicyclohexyl methane diisocyanate and 2.6 g of dibutyl tin dilaurylate (catalyst) were added thereto and the resultant was heated to 90 degrees C. to complete urethanation reaction in five hours. As a result, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine during vigorous stirring. Thereafter, 1,500 g of ice and 626 g of a 35 percent aqueous solution of 1,6-hexamethylene diamine were added to conduct chain elongation reaction followed by distilling away the solvent in such a manner that the concentration of the solid portion thereof was 30 percent to obtain a polyurethane resin emulsion 2.

The glass transition temperature (Tg) of the polyurethane resin emulsion 2 was 10 degrees as measured by Thermo plus EVO2 (manufactured by Rigaku Corporation).

Preparation of Polyurethane Resin Emulsion 3

1,500 g of polycarbonate diol (reaction product of 1,6-hexane diol and dimethyl carbonate, the number average molecular weight Mn of 1,200), 220 g of 2,2-dimethylol propionic acid (DMPA), and 1,347 g of N-methyl pyrrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of hexamethylene diisocyanate and 2.6 g of dibutyl tin dilaurylate (catalyst) were added thereto and the resultant was heated to 90 degrees C. to complete urethanation reaction in five hours. As a result, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine during vigorous stirring. Thereafter, 1,500 g of ice and 626 g of 35 percent aqueous solution of 2-methyl-1,5-pentane diamine were added to conduct chain elongation reaction followed by distillation away of the solvent in such a manner that the solid portion concentration was 30 percent to obtain polyurethane resin emulsion 3.

The glass transition temperature (Tg) of the polyurethane resin emulsion 3 was 61 degrees as measured by Thermo plus EVO2 (manufactured by Rigaku Corporation).

Preparation of Polyurethane Resin Emulsion 4

100.2 parts of polyester polyol (POLYLITE OD-X-2251, molecular weight of 2,000, manufactured by DIC Corporation), 15.7 parts of 2,2-dimethylol propionic acid, 48.0 parts of isophorone diisocyanate, 77.1 parts of methylethyl ketone as organic solvent were caused to react in a nitrogen-replaced container equipped with a thermometer, a nitrogen introducing tube, and a stirrer using 0.06 parts of dibutyl tin dilaurate (DMTDL) as catalyst.

After continuing the reaction for four hours, 30.7 parts of methylethyl ketone was supplied as diluting agent to further continue the reaction.

When the molecular weight of the reaction product reached to the range of from 20,000 to 60,000, 1.4 parts of methanol was charged to complete the reaction so that an organic solvent solution of urethane resin was obtained.

Thereafter, 13.4 parts of 48 percent by mass aqueous solution of potassium hydroxide was added to the organic solvent solution of urethane resin to neutralize the carboxyl group contained in the urethane resin. Thereafter, 715.3 parts of water was added followed by sufficient stirring and aging and solvent removal to obtain a polyurethane resin emulsion 4 having a solid portion of 30 percent by mass.

The glass transition temperature (Tg) of the polyurethane resin emulsion 4 was 74 degrees as measured by Thermo plus EVO2 (manufactured by Rigaku Corporation).

Next, Preparation Example of the ink are described.

Preparation of Ink 1

In the following formulation, deionized water was added as a balance so as to be 100 parts in total. Subsequent to preparation, the resultant was mixed and stirred followed by filtration with a filter having a pore diameter of 5 μm (Minisart®, manufactured by Sartorius Stedim Biotech GmbH) to obtain ink 1 of Example 1.

| | |
|---|---|
| Pigment liquid dispersion: | 15.0 parts |
| Polyurethane resin emulsion 2: | 10.0 parts |
| Silicone-based surfactant: (BYK-348, manufactured by BYK-Chemie GmbH): | 1.0 part |
| 1,3-butane diol (θ3 = 25 degrees): | 10.0 parts |
| 2-ethyl-1,6-hexane diol (θ3 = 10 degrees): | 5.0 parts |
| 3-Methoxy-3-methylbutanol (θ3 = 10 degrees): | 30.0 parts |
| PROXEL LV (asepticus, available from Avecia Inkjet Limited): | 0.1 parts |
| Deionized water: | Balance |

Preparation of Inks 2 to 10

Inks 2 to 7 of Examples 2 to 7 and Inks 8 to 10 of Comparative Examples 1 to 3 were prepared in the same manner as Ink 1 according to the formulation shown in Table 1.

The following was used for the materials other than the above-mentioned shown in Table 1.

1,2-propane diol (θ3=40 degrees C.)

3-methoxy-N,N-dimethylpropionamide (θ3=20 degrees)

Acrylic-silicone resin emulsion (AQ914, concentration of solid portion of 24 percent by mass, Tg of 50 degrees C., manufactured by (DAICEL FINECHEM LTD.)

Acrylic-silicone resin emulsion (AE982, concentration of solid portion of 50 percent by mass, Tg of 0 degrees C., manufactured by EMULSION TECHNOLOGY CO., LTD.)

Surfactant: FS300, fluorochemical surfactant, manufactured by E.I. du Pont de Nemours and Company)

TABLE 1

| | Component of Ink | Example No. | | | | | | |
|---|---|---|---|---|---|---|---|---|
| | | 1 Ink 1 | 2 Ink 2 | 3 Ink 3 | 4 Ink 4 | 5 Ink 5 | 6 Ink 6 | 7 Ink 7 |
| Coloring material | Black pigment liquid dispersion non-volatile portion of 15% | 15.0 | 15.0 | 15.0 | 15.0 | 15.0 | 15.0 | 15.0 |
| Resin particle | Acrylic-silicone resin emulsion (AQ 914), non-volatile portion of 24 percent, Tg = 50° C., manufactured by DAICEL FINECHEM LTD. | | | | | | 6.0 | |
| | Acrylic-silicone resin emulsion (AE 982), non-volatile portion of 50 percent, Tg = 0° C., manufactured by EMULSION TECHNOLOGY CO., LTD. | | | | | | | 12.0 |
| | Polyurethane resin emulsion 1 non-volatile portion of 30%, Tg = −5° C. | | | | | | | |
| | Polyurethane resin emulsion 2 non-volatile portion of 30%, Tg = 10° C. | 10.0 | | | | | | |
| | Polyurethane resin emulsion 3 non-volatile portion of 30%, Tg = 61° C. | | 10.0 | 10.0 | 10.0 | 10.0 | | |
| | Polyurethane resin emulsion 4 non-volatile portion of 30%, Tg = 74° C. | | | | | | | |
| Surfactant | BYK-348 (Silicone-based surfactant) | 1.0 | 1.0 | | 1.0 | 1.0 | 1.0 | 1.0 |
| | FS-300, fluorochemical surfactant | | | 1.0 | | | | |
| Organic solvent | 1.2-propane diol (bp: 188° C.) θ3 = 40° | | 10.0 | 10.0 | 10.0 | 10.0 | 10.0 | 10.0 |
| | 1,3-propane diol (bp: 207° C.) θ3 = 25° | 10.0 | | | | | | |
| | 3-methoxy-N,N-dimethyl-propione amide (bp: 216° C.) θ3 = 20° | | | | | 10 | | |

TABLE 1-continued

| | | Example No. | | | | | | |
|---|---|---|---|---|---|---|---|---|
| | | 1 | 2 | 3 | 4 | 5 | 6 | 7 |
| Component of Ink | | Ink 1 | Ink 2 | Ink 3 | Ink 4 | Ink 5 | Ink 6 | Ink 7 |
| | 2-ethyl-1, 6-hexane diol (bp: 243° C.) θ3 = 10° | 5.0 | | | | | | |
| | 3-Methoxy-3-methyl butanol (bp: 174° C.) θ3 = 10° | 30.0 | 30.0 | 30.0 | 25.0 | 20.0 | 30.0 | 30.0 |
| Additive | Proxel LV (manufactured by Avecia Inkjet Limited) | 0.1 | 0.1 | 0.1 | 0.1 | 0.1 | 0.1 | 0.1 |
| Water | Deionized water | Balance | Balance | Balance | Balance | Balance | Balance | Balance |
| Total amount | | 100 | 100 | 100 | 100 | 100 | 100 | 100 |
| Contact angle of ink against non-permeable substrate: θ1 | | 10 | 35 | 35 | 30 | 30 | 30 | 30 |
| Contact angle of ink against ink image: θ2 | | 20 | 40 | 40 | 35 | 35 | 35 | 35 |
| θ1/θ2 | | 0.5 | 0.9 | 0.9 | 0.9 | 0.9 | 0.9 | 0.9 |

| | | Comparative Example No. | | |
|---|---|---|---|---|
| | | 1 | 2 | 3 |
| Component of Ink | | Ink 8 | Ink 9 | Ink 10 |
| Coloring material | Black pigment liquid dispersion non-volatile portion of 15% | 15.0 | 15.0 | 15.0 |
| Resin particle | Acrylic-silicone resin emulsion (AQ 914), non-volatile portion of 24 percent, Tg = 50° C., manufactured by DAICEL FINECHEM LTD. | | 10.0 | |
| | Acrylic-silicone resin emulsion (AE 982), non-volatile portion of 50 percent, Tg = 0° C., manufactured by EMULSION TECHNOLOGY CO., LTD. | | | |
| | Polyurethane resin emulsion 1 non-volatile portion of 30%, Tg = −5° C. | | | |
| | Polyurethane resin emulsion 2 non-volatile portion of 30%, Tg = 10° C. | | | 10.0 |
| | Polyurethane resin emulsion 3 non-volatile portion of 30%, Tg = 61° C. | | | |

TABLE 1-continued

| | Component of Ink | Example No. | | | | | | |
|---|---|---|---|---|---|---|---|---|
| | | 1 Ink 1 | 2 Ink 2 | 3 Ink 3 | 4 Ink 4 | 5 Ink 5 | 6 Ink 6 | 7 Ink 7 |
| | Polyurethane resin emulsion 4 non-volatile portion of 30%, Tg = 74° C. | | | | 10.0 | | | |
| Surfactant | BYK-348 (Silicone-based surfactant) | | 1.0 | | 1.0 | | 1.0 | |
| | FS-300, fluorochemical surfactant | | | | | | | |
| Organic solvent | 1.2-propane diol (bp: 188° C.) θ3 = 40° | | 15 | | 10.0 | | 10.0 | |
| | 1,3-propane diol (bp: 207° C.) θ3 = 25° | | 15 | | | | | |
| | 3-methoxy-N,N-dimethyl-propione amide (bp: 216° C.) θ3 = 20° | | | | | | | |
| | 2-ethyl-1, 6-hexane diol (bp: 243° C.) θ3 = 10° | | 5.0 | | | | | |
| | 3-Methoxy-3-methyl butanol (bp: 174° C.) θ3 = 10° | | 10.0 | | 30.0 | | 30.0 | |
| Additive | Proxel LV (manufactured by Avecia Inkjet Limited) | | 0.1 | | 0.1 | | 0.1 | |
| Water | Deionized water | | Balance | | Balance | | Balance | |
| | Total amount | | 100 | | 100 | | 100 | |
| | Contact angle of ink against non-permeable substrate: θ1 | | 20 | | 35 | | 35 | |
| | Contact angle of ink against ink image: θ2 | | 10 | | 40 | | 40 | |
| | θ1/θ2 | | 2.0 | | 0.9 | | 0.9 | |

Using the obtained inks 1 to 10, "contact angle", "drying property", "abrasion resistance", "fixability (beading)", and "image glossiness" were evaluated as follows. The results are shown in Table 2.

In Examples 8 to 10, the drying conditions during printing were changed as shown in Table 2 using the ink of Example 1.

Forming of Solid Image

An inkjet printer (remodeled based on IPSiO GXe5500, manufactured by Ricoh Company Ltd.) were filled with the ink and recorded a solid image on a recording medium of polyvinyl chloride film (CPPVWP1300, manufactured by SAKURAI CO., LTD., hereinafter also referred to as PVC film) in an ink attachment amount of 0.6 g/cm². During recording, the solid image was dried for one hour on a hot plate (NINOS ND-1, manufactured by AS ONE Corporation.).

Note that the inkjet printer was remodeled to a degree that the remodeled machine was able to reproduce recording equivalent to a recording speed of 30 m²/hour with a print width of 150 cm on A4 size recording medium and the hot plate was mounted to change the heating conditions (heating temperature and heating time) during recording.

Measurement of Contact Angle

In the present disclosure, the contact angle is measured at 25 degrees C. by the following measuring method.

The state when one drop of ink was dropped on PVC film was observed from the horizontal direction, and the contact angle θ1 of the ink against the vinyl chloride resin film was measured using an automatic contact angle meter (manufactured by Kyowa Interface Science Co., Ltd.). Further, the state when one drop of ink was dropped on the solid image obtained by drying at 60 degrees C. for one hour as described above was observed from the horizontal direction, and the contact angle θ2 of the ink against the ink image was measured.

The contact angle was measured 5 seconds after the dropping to prevent the measuring value from changing due to evaporation of the droplet.

Drying Property

Filter paper was pressed against the solid image formed on the PVC film recording medium. The degree of transfer onto the filter paper was visually observed to evaluate the drying property according to the following criteria. B and above in the evaluation are preferable in terms of practical use.

Evaluation Criteria

A: Transfer of pigment to filter paper little observed
B: Transfer of pigment to filter paper slightly observed
C: Transfer of pigment to cotton cloth apparently observed

Abrasion Resistance

Thereafter, the solid image formed on the PVC film recording medium was abraded by a cotton cloth 10 times. The degree of transfer onto the cotton cloth was visually observed to evaluate abrasion resistance according to the following criteria. B and above in the evaluation are preferable in terms of practical use.

Evaluation Criteria

A: Transfer of pigment to cotton cloth little observed
B: Transfer of pigment to cotton cloth slightly observed
C: Transfer of pigment to cotton cloth apparently observed

Fixability (Beading)

Uneven recording of the solid image formed on the PVC film recording medium was visually observed to evaluate fixability (beading) according to the following evaluation criteria. B and above in the evaluation are preferable in terms of practical use.

Evaluation Criteria

A: Excellent (No beading observed)
B: Good (Beading slightly observed)
C: Fair (Beading observed)
D: Poor (Beading significantly observed)

Image Glossiness

Gloss at 60 degrees of the solid image formed on the PVC film recording medium was measured by a gloss meter (4501, manufactured by BYK Gardener) four times to obtain the average of the gloss values to evaluate image glossiness according to the following criteria. B and above in the evaluation are preferable in terms of practical use.

Evaluation Criteria
AA: Gloss value is 100 or greater
A: Gloss value is 90 to less than 100
B: Gloss value is 80 to less than 90
C: Gloss value is less than 80

TABLE 2

| | | Dry condition | Evaluation result | | | |
|---|---|---|---|---|---|---|
| | | Temperature (degrees C.) of plate heater | Drying Property | Abrasion resistance | Fixability (Beading) | Image glossiness |
| Example | 1 | 60 | A | A | A | AA |
| | 2 | 60 | A | A | A | AA |
| | 3 | 60 | A | A | A | A |
| | 4 | 60 | A | A | B | AA |
| | 5 | 60 | B | A | B | AA |
| | 6 | 60 | A | B | A | AA |
| | 7 | 60 | B | B | A | AA |
| | 8 | 40 | A | A | A | AA |
| | 9 | 30 | B | A | B | AA |
| | 10 | 70 | A | A | A | A |
| Comparative Example | 1 | 60 | B | B | D | C |
| | 2 | 60 | C | B | C | B |
| | 3 | 60 | B | C | B | A |

Examples 1, 2, and 8 are preferable embodiments of the present disclosure and demonstrates excellent drying property and fixability. Also, the obtained printed images on a non-permeable recording medium are found to have a high degree of image gloss and good abrasion resistance.

Example 3, in which a silicone-based surfactant was not used, was inferior to Examples 1, 2, and 8 with respect to image glossiness.

In Example 4, the proportion of the organic solvent having a contact angle θ1 of 20 degrees or less of the ink against the impermeable recording medium is less than 30 percent, which was inferior to Examples 1, 2, and 8 with regard to fixability.

In Example 5, the proportion of the organic solvent having a boiling point of 180 degrees C. or lower is less than 30 percent, which was inferior to Examples 1, 2, and 8 with regard to drying property and fixability.

Examples 6 to 7, in which a polyurethane resin was not used, were inferior to Examples 1, 2, and 8 with regard to drying property and abrasion resistance.

Example 9, in which the temperature of the plate heater was slightly low, which was inferior to Examples 1, 2, and 8 with regard to drying property and fixability.

Example 10, in which the temperature of the plate heater was slightly high, which was inferior to Examples 1, 2, and 8 with respect to image glossiness.

In Comparative Example 1, the relationship of θ1<θ2 was not satisfied, and the results were in inferior to Examples with regard to fixability and image glossiness.

In Comparative Example 2, in which the glass transition temperature (Tg) of the resin particles was higher than 70 degrees C., the result was inferior to Examples with regard to drying properties and fixability.

In Comparative Example 3, in which the glass transition temperature (Tg) of the resin particles was lower than 0 degrees C., the resultant was inferior to Examples with regard to abrasion resistance.

As seen in the evaluation results shown in Table 2, the ink of the present disclosure is found to be suitable for outdoor use. The inks of Examples 1 to 7 were excellent with regard to drying property, abrasion resistance, fixability, and image glossiness.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink comprising:
   water;
   an organic solvent comprising at least one first organic solvent having a contact angle θ3 of 20 degrees or less against a vinyl chloride resin film; and
   a resin having a glass transition temperature Tg of from 0 to 70 degrees C.,
   wherein a contact angle θ1 of the ink against the vinyl chloride resin film and a contact angle θ2 of the ink against an ink image formed with the ink satisfies θ1<θ2, and
   a total amount of the at least one first organic solvent in the ink is 25 percent by mass or more.

2. The ink according to claim 1, further comprising a silicone-based surfactant.

3. The ink according to claim 1, wherein the total amount of the at least one first organic solvent is 30 percent by mass or more.

4. The ink according to claim 1, wherein the organic solvent comprises at least one second organic solvent having a boiling point of 180 degrees C. or lower such that a total amount of the at least one second organic solvent in the ink is 30 percent by mass or more, wherein the at least one second organic solvent is identical to or different from the at least one first organic solvent.

5. The ink according to claim 4, wherein the ink comprises 3-methoxy-3-methylbutanol as the first and second organic solvents.

6. The ink according to claim 1, wherein the resin comprises a polyurethane resin.

7. The ink according to claim 6, wherein the polyurethane resin comprises a polyurethane resin particle.

8. An ink accommodating unit comprising:
   a container; and
   the ink of claim 1 accommodated in the container.

9. An inkjet printing device comprising:
   the ink accommodating unit of claim 8.

10. A printing method comprising:
    attaching the ink of claim 1 to a substrate.

11. The printing method according to claim 10, further comprising discharging the ink to the substrate.

12. The printing method according to claim 10, further comprising heating the substrate at 40 to 60 degrees C. by a plate heater.

13. The ink according to claim 1, wherein the at least one first organic solvent is at least one selected from the group consisting of tripropylene glycol monomethyl ether, 2-ethyl-1,6-hexanediol, 3-methoxy-3-methylbutanol, and 3-methoxy-N,N-dimethylpropionamide.

14. The ink according to claim 1, wherein the resin comprises a polyurethane resin and has the glass transition temperature Tg of from 0 to 61 degrees C.

* * * * *